Jan. 2, 1962     E. G. EWING     3,015,513
IMPACT RELEASE DEVICE
Filed Sept. 21, 1959
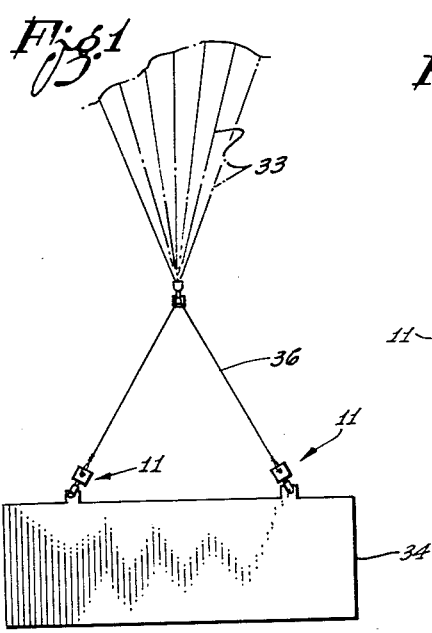
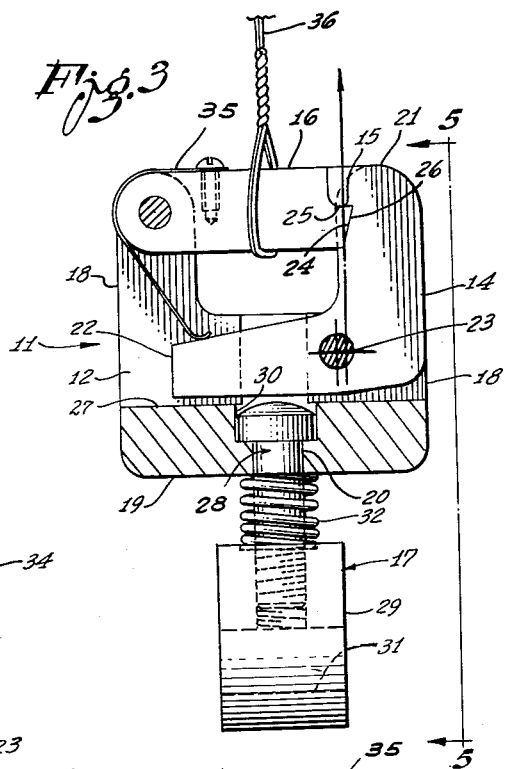
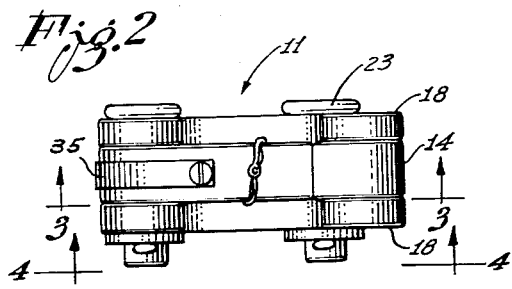
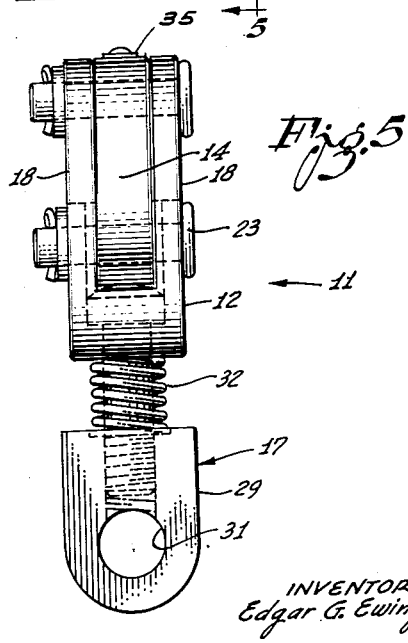
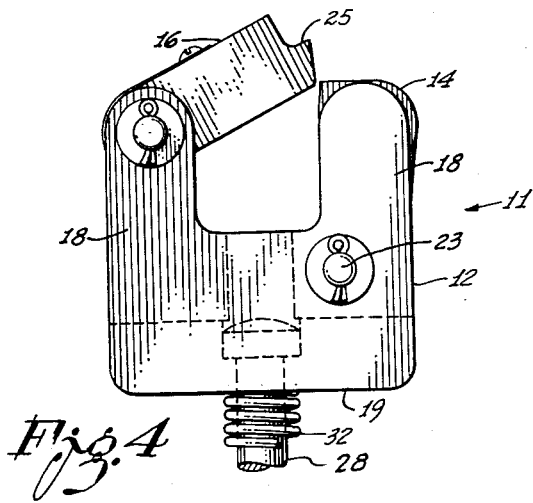
INVENTOR:
Edgar G. Ewing
By Willard M. Graham
Agent 3,015,513
IMPACT RELEASE DEVICE
Edgar G. Ewing, Sepulveda, Calif., assignor to Northrop Corporation, Beverly Hills, Calif., a corporation of California
Filed Sept. 21, 1959, Ser. No. 841,374
4 Claims. (Cl. 294—83)

This invention pertains to release mechanisms and more particularly to an automatic release device adapted to release a cable, line, parachute harness or the like at such time as the device is subjected to an impact shock of predetermined magnitude.

Release devices of a character similar to the one disclosed herein quite frequently incorporate complicated mechanisms resulting in malfunctioning tendencies and premature operation thereof. Inasmuch as a release device displaying the above characteristics is highly objectionable the need for a simple automatic mechanical device adapted to eliminate the above objectionable features is readily apparent. For purposes of illustration the instant device is shown and described as a parachute load release, however, it should be understood that the instant device may be effectively utilized in other installations.

Accordingly, it is an object of the present invention to provide an automatic release device which is entirely mechanical in operation and in which the components thereof are arranged so that applied loads have no tendency to trigger the device.

Another object is to provide an automatic release device which is responsive to impact shock of predetermined magnitude.

Another object is to provide an automatic release device which provides assurance against premature operation.

Another object is to provide an automatic release device which is not triggered at such times as tension forces acting thereon are momentarily relaxed or are completely removed therefrom.

Another object is to provide an automatic release device which is simple and compact in design and construction, which is economical to manufacture and which may be used in a plurality of applications.

Although the characteristic features of the present invention are particularly pointed out in the appended claims, the invention itself, also the manner in which it may be carried out, will be better understood by referring to the following description taken in connection with the accompanying drawings forming a part of this application and in which:

FIGURE 1 shows an application of the release device as disclosed herein in which the device is utilized to support a load from the harness of a parachute.

FIGURE 2 is a plan view of the release device disclosed herein.

FIGURE 3 is a sectional view of the release device shown in FIGURE 2, the section being taken on the line 3—3 of the latter figure.

FIGURES 4 and 5 are elevational views of the release device as disclosed herein viewed as indicated by the arrows 4—4 and 5—5 of FIGURES 2 and 3, respectively, the released position of the device being shown in FIGURE 4.

Referring to the drawings, the release device as disclosed herein, identified in its entirety by the numeral 11, consists of frame member 12, a latch member 14, a bar member 16 and an impact assembly 17.

The frame member 12 is of U-shaped configuration consisting of bifurcated leg members 18—18 and a bight portion 19. A bore 20 and counterbore 30 are provided in the bight portion of the frame member 12 and function to receive the impact assembly 17 in a manner to be explained presently. The frame member 12 includes a surface 27 defining the inner ends of the bifurcated leg members 18—18. The leg members 18—18 and the axes of the bore 20 and counterbore 30 have a normal relation with respect to the surface 27.

The latch member 14 is L-shaped having arms 21 and 22 as best seen in FIGURE 3. In its assembled position, the latch member 14 is positioned between the bifurcated portions of the leg members 18 and is pivotally attached to one of the legs by means of a clevis pin 23 or the like as best seen in FIGURES 3 and 4.

The bar member 16 is elongated having an aperture at one end thereof and is shaped at its other end to provide a stepped portion 24 including a surface 25 adapted to contact and cooperate with the latch member at such times as the members 14 and 16 are assembled in the frame member 12.

In its assembled position, the apertured end of the bar member 16 is pivotally mounted between the bifurcated outer end portions of the leg 18 opposite the leg in which the latch member 14 is mounted. The outer end portion of the arm 21 has a groove 26 formed therein corresponding in configuration to the stepped end of the bar member 16 and includes a surface 15. In this respect it will be noted that, with the members 14 and 16 in their assembled and latched positions in the frame 12, the stepped portion 24 is received in the groove 26 and the surfaces 15 and 25 have a mating relation and a parallel relation with respect to the longitudinal axis of the member 16. Thus it will be seen that tensile forces acting on the release device 11, tending to separate the members 14 and 16, act in a direction normal to the surfaces 15 and 25. These forces will not provide any effective force tending to separate the bar member 16 from the latch member 14, in fact tensile forces acting on the device 11 generate a closing moment on the latch lever 14.

One end of a simple leaf spring 35 is secured to the bar member 16 by screw means or the like. In the assembled relation of the members 14 and 16 on the frame member 12, the spring 35 is wrapped around the apertured end of the member 16 and its other end rests on the outer end portions of the arm 22 of the member 14, as best seen in FIGURE 3. Thus it will be seen that the spring 35 serves a dual purpose; (1) it maintains the members 14 and 16 in their latched relation and (2) functions, at such time as the bar member is released from the latch member 14, to rotate the member 16 in a counter-clockwise direction to its open position as shown in FIGURE 4.

The impact assembly 17 consists of a bolt member 28 and an adapter member 29. The adapter member 29 is secured to the shank of the bolt member 28 and the adapter has an aperture 31 formed therein the axis of which has a normal relation with respect to the axis of the bolt member. In its assembled relation the shank of the bolt member 28 is positioned in the bore 20 with the head portion thereof positioned in the counterbore 30. The bolt member is held in the position as described above (FIGURE 3) by means of a coil spring 32 which surrounds the shank 28 and bears on the frame 12. Thus it will be seen that the spring 32 maintains the impact assembly 17 in the position shown in FIGURE 3 until such time as it is acted on by an impact force or the like.

Referring now to FIGURE 1, here the release device 11 is shown as being utilized to provide a releasable connection between the harness 36 of a parachute (not shown) and a load 34 suspended by the parachute. In this embodiment a pin or the like (not shown), attached to the load 34, passes through the aperture 31 while the looped end of the harness 36 loosely surrounds the bar member 16 while its other end is attached to suspension lines 33 of the aforementioned parachute.

With the release device 11 rigged as described above, substantially as shown in FIGURE 1, it will be apparent that as the load 34 contacts a landing surface the latter will experience an impact shock. This impact shock is transmitted through the adapter member 29 to the bolt member 28 due to the inertia of the frame member 12, etc. This inertial force results in relative movement of the bolt and frame members 28 and 12, respectively, compressing the spring 32 at such time as the longitudinal component of the force due to deceleration is directed along the axis of the bolt member 28. Sufficient relative motion of the bolt member 28 with respect to the frame member 12 forces the head of the bolt member into contact with the arm 22 of the latch member 14. The head of the bolt member contacting the arm 22 rotates the latch member 14 in a clockwise direction (FIGURE 3). The bar member 16 is now free to pivot to its open position releasing the load 34 from the harness 36 and consequently the suspension lines 33. The bar member 16 is pivoted to its open position by the reaction of the leaf spring 35 and also by any residual tension in the harness and suspension lines 36 and 33, respectively.

In the application of release device 11 as shown in FIGURE 1 it will be seen that the load 34 is suspended by at least a pair of release devices. During the drop tension in one or more of the cables of the harness 36 may be momentarily relaxed; under such conditions, however, the bar member 16 will not be released as it will be held in its latched position by the spring 35. The sensitivity of the device 11 can also be varied by changing the spring 32 for one having a different spring rate. For example, the sensitivity of the device 11, if it is to be subjected to large accelerations of moderate onset, can be reduced by increasing the spring constant while at the same time maintaining good sensitivity to "sharp edged" impact decelerations by reducing the length of travel required to trip the latch member 14.

While in order to comply with the statute, the invention has been described in language more or less specific as to structural features, it is to be understood that the invention is not limited to the specific features shown, but that the means and construction herein disclosed comprises a preferred form of putting the invention into effect, and the invention is therefore claimed in any of its forms or modifications within the legitimate and valid scope of the appended claims.

What is claimed is,

1. An impact release device comprising: a frame member; catch and latch members pivotally mounted on said frame member; said catch and latch members having operative positions in which said latch member contacts and maintains said catch member in a fixed position with respect to said frame member and an inoperative position in which said latch member is spaced from said catch member and the latter is free to pivot on said frame member; impact responsive means mounted on said frame member for movement between a first position in which said impact means is spaced from said latch member and a second position in which said impact means contacts and moves said latch member to said inoperative position thereby allowing said catch member to also move to said inoperative position; and resistance means between said impact means and said release device normally maintaining said impact means in said first position.

2. An impact release device as set forth in claim 1, further characterized by including unitary spring means effective to maintain said latch and catch members in their operative positions and also is effective to urge said catch member to said inoperative position at such times as said latch member is moved to said inoperative position.

3. An impact release device as set forth in claim 1, further characterized by including an external member on said impact means in position to be struck by an object coming in relative contact with said device, said resistance means having a predetermined force to be overcome and thus cause said impact means to move to said second position.

4. An impact release device comprising: a U-shaped frame member including leg members and a bight portion; said leg members being bifurcated; an elongated catch member one end of which is pivotally mounted between the bifurcated portions of one of said leg members; an L-shaped latch member having two arm portions and being centrally pivotally mounted between the bifurcated portions of the other one of said legs; said catch and latch members having operative positions in which the outer end of one arm portion of said latch member contacts and maintains said catch member in a fixed relation with respect to said frame member and an inoperative position in which the one arm portion of said latch is spaced from said catch member and the latter is free to pivot on said frame member; exterior-projecting impact responsive means mounted on said frame member for movement between a first extended position in which said impact means is spaced from said latch member and a second retracted position in which said impact means contacts the other arm of said latch member and moves said latch member to said inoperative position thereby allowing said catch member to also move to said inoperative position; and elastic means between said impact means and said frame member biasing said impact means in its first position.

References Cited in the file of this patent

UNITED STATES PATENTS

| 2,131,445 | Lawton | Sept. 27, 1938 |
| 2,435,649 | Gray | Feb. 10, 1948 |
| 2,469,574 | Quilter | May 10, 1949 |

FOREIGN PATENTS

| 940,466 | France | May 24, 1948 |